3,632,802
OXIDATION OF CARBOHYDRATES
James N. BeMiller, Murphysboro, and Stephen D. Darling, Carbondale, Ill., assignors to Southern Illinois University Foundation, Carbondale, Ill.
No Drawing. Filed Dec. 6, 1968, Ser. No. 781,984
Int. Cl. C08b 19/01
U.S. Cl. 260—233.3 R                                8 Claims

ABSTRACT OF THE DISCLOSURE

Carbohydrates such as starch and cellulose having unsubstituted primary hydroxyl groups are oxidized with an alkali metal ferrate, such as potassium ferrate, to yield products in which at least one of the primary hydroxyl groups is converted to an aldehyde group. The use of such a ferrate compound as the oxidizing agent permits oxidation to be carried out without the formation of carboxyl groups, without the oxidation of secondary hydroxyl groups and without scission of carbon to carbon bonds in the carbohydrate molecule. The resulting products exhibit improved physical properties and may be used, for example, in paper sizing applications or as chemical intermediates in the preparation of other useful derivatives.

BACKGROUND OF THE INVENTION

This invention lies in the field of carbohydrates and, more particularly, relates to the oxidation of carbohydrates to convert one or more primary hydroxyl groups to aldehyde groups.

It has been common practice heretofore to treat carbohydrates such as starch and cellulose with various oxidizing agents in order to impart certain desired physical properties or for bleaching. For example, starch has been oxidized with hypochlorite (chlorine and alkali) to produce products containing carboxyl groups, aldehyde groups and keto groups. Depolymerization of the starch molecule occurs particularly when oxidation is carried out in an alkaline system. Hypochlorite oxidation of cellulose produces similar results, the oxidized products containing carboxyl, aldehyde and keto groups. With both starch and cellulose, the functional groups formed on the oxidized products account for about 40% of the oxidizing agent consumed, the balance of the oxidizing agent being consumed in chain scission and in the oxidation of soluble fragments. Oxidized starch products exhibit various properties not characteristic of nonoxidized starches, and large quantities of oxidized starches are used in the paper industry for surface sizing and pigment coating of paper and in the textile industry for finishing operations.

Oxidation of starch with the periodate ion results in reaction of the ion with the 2,3-glycol group of starch to cleave the carbon-carbon bond with the resultant formation of two carbonyl groups. The most widely used product of periodate oxidation of starch is called "dialdehyde starch" even though few of the carbonyl groups are free but rather appear to be in hemiacetal linkage with the primary alcohol or hydroxyl groups and in hemialdal linkage by reaction with water. Dialdehyde starch exhibits most of the characteristic reactions of carbonyl groups and the aldehyde groups can be oxidized to carboxyl groups or reduced to alcohols. Most of the annual production of dialdehyde starch is utilized in the production of wet strength paper for toweling, sanitary tissue, maps and the like.

Other oxidizing agents have been employed in the past to oxidize carbohydrates such as starch. However, none of these result in commercially useful oxidized products. For example, nitrogen dioxide oxidizes starch with some specificity, the C-6 hydroxyl groups being oxidized to carboxyl groups with some 2- and 3-keto groups also being formed. Oxidation of starch with chromic anhydride in a nonaqueous system or in 0.2 M sulfuric acid introduces aldehyde, ketone and carboxyl groups and oxidation with potassium dichromate at pH 0.7 is reported to give a product containing 60% of 2,3-dialdehyde groups. Permanganate oxidation of starch introduces carbonyl and carboxyl groups, ozone in water introduces carbonyl groups (mostly aldehyde), and chlorine in methanol results mainly in depolymerization of the starch molecule.

While, as indicated, certain commercially useful products have been obtained from the oxidation of carbohydrates such as starch and cellulose, there has not been available heretofore a method of selectively oxidizing the primary hydroxyl groups of carbohydrates to aldehyde groups without at the same time oxidizing secondary hydroxyl groups, forming carboxyl groups and/or rupturing carbon to carbon bonds in the carbohydrate molecule. There has thus been no available method for preparing useful "monoaldehyde" products.

SUMMARY OF THE INVENTION

Among the several objects of the invention, therefore, may be noted the provision of a practical method for selectively oxidizing the primary hydroxyl group of carbohydrates such as starch and cellulose to an aldehyde group; the provision of such a method which does not result in the oxidation of secondary hydroxyl groups, the formation of carboxyl groups or the scission of carbon to carbon bonds in the carbohydrate molecule; the provision of a method of the type described which utilizes relatively inexpensive oxidizing agents; and the provision of such a method which may be conveniently carried out with good yields of the oxidized products. Other objects will be in part apparent and in part pointed out hereinafter.

The present invention is thus directed to the method of oxidizing a carbohydrate such as starch or cellulose having an unsubstituted primary hydroxyl group which comprises treating the carbohydrate with an alkali metal ferrate, preferably potassium ferrate, to oxidize at least one primary hydroxyl group of the carbohydrate to an aldehyde group. The invention is also directed to certain novel oxidized starch products produced by the method of the invention.

DESCRIPTION OF THE PREFERRED EMBODIMENTS

In accordance with the present invention, it has now been found that alkali metal ferrates, especially potassium ferrate, are specific oxidizing agents and selectively oxidize the primary hydroxyl group of carbohydrates to an aldehyde group. Surprisingly, it has been found that oxidation of the primary hydroxyl group to an aldehyde group is achieved without oxidation of secondary hydroxyl groups, without the formation of carboxyl groups and without rupture of carbon to carbon bonds in the carbohydrate molecule. This permits the production of useful monoaldehyde products not obtainable with the use of oxidizing agents previously employed by the prior art.

While alkali metal ferrates such as sodium ferrate and lithium ferrate may be used in the practice of the invention, the use of potassium ferrate is preferred. Potassium ferrate can be prepared from inexpensive reagents, i.e., potassium hydroxide, ferric nitrate and chlorine, by the Wood modification [R. H. Wood, Journal of the American Chemical Society, 80, 2038–41 (1958)] of the method described by G. W. Thompson, L. T. Ockerman and J. M. Schreyer, Journal of the American Chemical Society, 73, 1379–81 (1951).

In carrying out the practice of the invention, the carbohydrate is dissolved in water and the potassium ferrate is added to the resulting solution. The reaction mixture is then stirred for a sufficient period of time to obtain the desired degree of oxidation of the primary hydroxyl groups of the carbohydrate to aldehyde groups. The oxidation reaction proceeds fairly rapidly and for oxidation of all primary hydroxyl groups of the particular carbohydrate being treated to aldehyde groups, the reaction must be allowed to proceed for a sufficient period to permit complete oxidation. Oxidation for shorter periods of time will result in oxidation of less than all primary hydroxyl groups of the carbohydrate and the reaction may be discontinued after the desired degree of oxidation has been attained. In general, reaction for a period of about two hours is sufficient to obtain complete oxidation of most carbohydrates. It has been found that oxidation goes to completion more readily if small increments of the oxidizing agent are added to the reaction mixture periodically.

The time required to complete oxidation of the primary hydroxyl groups of a carbohydrate to aldehyde groups may be reduced by carrying out the oxidation at elevated temperatures, e.g., 40–70° C. In the case of a carbohydrate such as starch, care must be taken not to exceed the temperature (approximately 70° C.) at which gelatinization of the starch occurs.

In general, it is preferred to carry out the oxidation method of the invention at a high pH, i.e., 10 and above, since potassium ferrate tends to decompose at lower pH values. For example, at a pH of 7 potassium ferrate will react with water and decompose into oxygen and ferric hydroxide. When prepared by the method referred to above, potassium ferrate contains free alkali which assists in maintaining the desired high pH in the aqueous reaction medium.

The oxidation of carbohydrates in accordance with the method of the invention is accompanied by the formation and precipitation of ferric hydroxide. In the case of soluble carbohydrates, separation of the ferric hydroxide from the oxidized carbohydrate product in solution may be effected simply by filtration. In the case of insoluble starches, the oxidized product is washed with a material adapted to solubilize the ferric ion and thereby enable separation to be effected by filtration. For example, solubilizing agents such as sodium oxalate or sodium citrate may be employed for this purpose or chelating agents such as ethylenediaminetetraacetic acid and salts thereof may also be used.

If a sufficient amount of the potassium ferrate oxidizing agent is used and if oxidation is permitted to continue for a sufficient period of time, complete oxidation or oxidation of all of the primary hydroxyl groups to aldehyde groups may be achieved with yields of 100% of the oxidized product. Some of the oxidized product may, however, be lost in isolating and separating the product from the ferric hydroxide formed during the oxidation reaction.

The oxidation method of the invention, as described above, may be used for the oxidation of any carbohydrate, i.e., monosaccharides, oligosaccharides or polysaccharides, which has unsubstituted primary hydroxyl groups and results in the selective conversion of such primary hydroxyl groups to aldehyde groups. With carbohydrates, such as sorbitol, having two primary hydroxyl groups, oxidation of both groups to aldehyde groups occurs simultaneously. Through the present invention and by using varying amounts of the ferrate oxidizing agent and carrying out the oxidation for varying periods of time, a practical means is provided for controlling the degree of oxidation and thereby controlling the properties imparted to the oxidized products by the aldehyde groups therein. Thus, the method of the present invention permits the preparation of products oxidized to varying degrees or having varying numbers of aldehyde groups, the properties of such oxidized products varying according to the degree of oxidation.

The following examples further illustrate the invention.

EXAMPLE 1

Methyl α-D-glucopyranoside (1.0 g.) was dissolved in water (100 ml.). To this solution was added potassium ferrate (2.0 g.). The reaction mixture was stirred for two days at 50° C. The product, methyl α-D-gluco-hexodialdo-1,5-pyranoside, obtained after filtration and evaporation was characterized by oxidation with sodium hypoiodite (NaOI) or bromine water to methyl α-D-glucopyranosiduronic acid. The latter compound has been reported many times in the patent literature (cf. U.S. Pats. 2,520,255; 2,520,256; 2,562,200; 2,592,249; 2,627,520 and 2,650,237). Overall yield of methyl α-D-gluco-hexodialdo-1,5-pyranoside, 0.44 g. (41%).

Additional characterization was afforded by reduction of the product with sodium borohydride ($NaBH_4$) to yield methyl α-D-glucopyranoside, the starting material. Paper and thin layer chromatograms were run on all products. The aldehyde product chromatographed as a streak rather than a nice spot undoubtedly because of the formation of intramolecular hemiacetals. No starting compound or uronic acid was detected in the methyl α-D-gluco-hexodialdo-1,5-pyranoside product by such chromatography.

EXAMPLE 2

Methyl α-D-galactopyranoside (1.14 g.) was dissolved in water (100 ml.). To this solution was added potassium ferrate (2.0 g.). The reaction mixture was stirred for two days at 50° C. The product, methyl α-D-galacto-hexodialdo-1,5-pyranoside, obtained after filtration and evaporation was characterized by oxidation with sodium hypoiodite (NaOI) or bromine water to methyl α-D-galactopyranosiduronic acid; M.P. 105–106° C., $[\alpha]_D^{30} +140°$ (c. 0.5, $H_2O$). Reported M.P. 107–108° C., $[\alpha]_D^{30} +128°$ (c. 2, $H_2O$) [C.A. Marsh, Journal of the Chemical Society, 1578–82 (1952) and others]. Overall yield of methyl α-D-galacto-hexodialdo-1,5-pyranoside, 0.45 g. (44%).

Additional characterization was afforded by reduction of the product with sodium borohydride ($NaBH_4$) to yield methyl α-D-galactopyranoside. Paper and thin layer chromatograms were run on all products. The aldehyde product again chromatographed as a streak. No starting compound or uronic acid was detected in the methyl α-D-galacto-hexodialdo-1,5-pyranoside product by such chromatography.

EXAMPLE 3

Examples 1 and 2 were repeated to oxidize methyl α-D-mannopyranoside to methyl α-D-manno-hexodialdo-1,5-pyranoside with similar results.

EXAMPLE 4

Examples 1 and 2 were repeated to oxidize D-glucitol (sorbitol) under the same conditions to yield a product with a carbonyl stretching frequency in the infrared and which, when reduced with sodium borohydride ($NaBH_4$), yielded only D-glucitol.

In Examples 1–4 there was no indication that any hydroxyl groups, other than primary or terminal hydroxyl groups, were oxidized. Thus, in Example 4, if secondary hydroxyl groups of D-glucitol had been oxidized, reduction with sodium borohydride would have resulted in diastereoisomers of D-glucitol as well as D-glucitol itself.

EXAMPLE 5

Examples 1 and 2 were repeated to oxidize commercial corn starch with varying amounts of potassium ferrate in the same manner as described. Sodium oxalate or sodium citrate was included in the reaction mixture to reduce the amount of ferric hydroxide retained by the starch. The remaining ferric ions were washed from the starch products with oxalic acid to yield colorless products. The oxidized starch products were pasted in hot water and the reducing power thereof was determined by a modification of the 3,5-dinitrosalicylate method of J. B. Sumner and G. F. Somers in Laboratory Experiments in Biological Chemistry (Academic Press Inc., New York, N.Y. 1944). The reducing power as determined by this procedure is a measure of the aldehyde groups in the oxidized starch products. The results were as follows.

| G. $K_2FeO_4$/g. starch treated: | A function of glucose equiv./g. starch |
|---|---|
| 1.4 | 2.3 |
| 3.1 | 8.1 |
| 4.0 | 8.4 |

It will be understood that carbohydrates other than those used in the foregoing examples may be oxidized by the method of the invention with similar results.

In view of the above, it will be seen that the several objects of the invention are achieved and other advantageous results attained.

As various changes could be made in the above methods and products without departing from the scope of the invention, it is intended that all matter contained in the above description shall be interpreted as illustrative and not in a limiting sense.

What is claimed is:

1. The method of oxidizing a carbohydrate having an unsubstituted primary hydroxyl group which comprises treating said carbohydrate with an alkali metal ferrate in an aqueous medium at a pH of not less than approximately 10 to oxidize at least one primary hydroxyl group of said carbohydrate to an aldehyde group.

2. The method as set forth in claim 1 wherein the carbohydrate is a polysaccharide.

3. The method as set forth in claim 2 wherein the carbohydrate is a starch.

4. The method as set forth in claim 1 wherein the alkali metal ferrate is potassium ferrate.

5. The method of oxidizing a carbohydrate having an unsubstituted primary hydroxyl group which comprises treating said carbohydrate with potassium ferrate in an aqueous medium at a pH of not less than approximately 10 to oxidize at least one primary hydroxyl group of said carbohydrate to aldehyde group and thereafter isolating the resulting oxidized carbohydrate product substantially free of ferric ions.

6. The method as set forth in claim 5 wherein the carbohydrate is a polysaccharide.

7. The method of oxidizing a starch having unsubstituted primary hydroxyl groups which comprises treating the starch with potassium ferrate in an aqueous medium at a pH of not less than approximately 10 to oxidize at least one primary hydroxyl group of said starch to an aldehyde group and thereafter isolating the resulting oxidized starch product substantially free of ferric ions.

8. An oxidized starch product characterized by at least one primary aldehyde group and prepared by the method of claim 7.

References Cited

UNITED STATES PATENTS

| 3,203,885 | 8/1965 | Meiners et al. | 204—158 |
| 3,313,641 | 4/1967 | Bochert | 106—213 |

DONALD E. CZAJA, Primary Examiner

M. I. MARQUIS, Assistant Examiner

U.S. Cl. X.R.

117—139.5 C, 143 R; 260—209 R, 209 D, 212 R, 233.5 R, 620 R